United States Patent [19]
Gomberg et al.

[11] Patent Number: 5,413,293
[45] Date of Patent: May 9, 1995

[54] MAGNETIC TORQUE ATTITUDE CONTROL SYSTEMS

[75] Inventors: Louis Gomberg, Redondo Beach; Shibu Basuthakur; Joseph H. Hayden, both of Rancho Palos Verdes, all of Calif.

[73] Assignee: Hughes Aircraft Company, Los Angeles, Calif.

[21] Appl. No.: 995,114

[22] Filed: Dec. 22, 1992

[51] Int. Cl.⁶ .............................................. B64G 1/00
[52] U.S. Cl. ................................. 244/166; 244/164; 244/173
[58] Field of Search ................ 244/164, 166, 173; 136/245, 292

[56] References Cited

U.S. PATENT DOCUMENTS

| | | | |
|---|---|---|---|
| Re. 29,177 | 4/1977 | Michaelis | 244/166 |
| 3,390,848 | 7/1968 | Crocker, II et al. | 244/166 |
| 5,141,180 | 8/1992 | Reboux | 244/173 |
| 5,158,250 | 10/1992 | Reboux | 244/166 |

FOREIGN PATENT DOCUMENTS

1132392 10/1968 European Pat. Off. .

*Primary Examiner*—Michael S. Huppert
*Assistant Examiner*—Anne E. Bidwell
*Attorney, Agent, or Firm*—Gordon R. Lindeen, III; William J. Streeter; Wanda K. Denson-Low

[57] ABSTRACT

A magnetic torquing system for a spacecraft using conducting coils is disclosed. In one embodiment, the conductors (44, 46) on a spacecraft's (10) solar wing (28, 30) which connect the solar cell strings (38) to the voltage controller (48) are wired to produce a magnetic torque which can be regulated by shunting individual strings to ground (52) or by opening a string circuit. This embodiment does not require the extra weight of a coil because the panel's solar string produces the torque normally produced by an additional coil. In another embodiment, a coil (44, 46) is wired between a shunting switch (54) in the spacecraft voltage controller (48) and a ground (32) so that shunting a string to ground (52) supplies current first to the coil to generate a magnetic torque in the desired direction.

24 Claims, 7 Drawing Sheets

MAGNETIC TORQUE ATTITUDE CONTROL SYSTEMS

FIELD OF THE INVENTION

The present invention pertains to the field of spacecraft attitude control using torques.

BACKGROUND OF THE INVENTION

Spacecraft, whether in orbit or on a trajectory to a distant celestial body, are subject to a variety of different attitude disturbing torques. For a spacecraft with solar wings that is travelling in most any earth orbit, one of the most troublesome of these is solar pressure on the surface of the spacecraft. Because solar wings are typically far away from the spacecraft's center of mass and have a large surface area, solar wings typically generate substantial solar pressure disturbance torques. In order to compensate for these disturbance torques, it is known to mount a magnetic torquing coil on the solar wing as described, for example, in Reissue Patent No. 29,177 to Michaelis. A magnetic torquing coil on the solar wing has the advantage over a magnetic torquing coil on the spacecraft main body in that it operates from a point which is distant from the spacecraft center of mass and the resulting torque is always aligned with the solar pressure vector. The solar wing acts as a lever arm on the spacecraft main body enhancing the effectiveness of the magnetic torquing coil. However, the magnetic coil adds a significant amount of weight to the spacecraft and consumes power which might otherwise be used to operate components on the spacecraft main power bus.

SUMMARY OF THE INVENTION

The present invention allows for an effective attitude disturbance compensation system which may be mounted on the solar wing, which does not increase weight and which does not appreciably reduce the amount of power available to the spacecraft main power bus.

In one embodiment, the invention encompasses an attitude control system for a spacecraft which has a main body and a solar wing extending from the main body. The solar wing may have one or more solar panels. An electrically conducting coil is coupled to solar cells on the solar panel and conducts current generated by the solar panel to the spacecraft main body for use by the spacecraft. The coil is positioned so as to generate a magnetic field to interact with an external magnetic field for adjusting the attitude of the spacecraft. The external magnetic field may be that of the earth or some other celestial body which the spacecraft is orbiting or it may be a particularly strong magnetic field of some other nearby celestial body.

In another embodiment, the invention encompasses an attitude control system for a spacecraft which has a main body and a solar wing extending from the main body and in which a panel on the solar wing has a plurality of solar cell strings independently coupled to the spacecraft power bus for generating electric current for use by the spacecraft. An electrically conducting coil on the solar panel is adapted to carry current for generating a magnetic field for interacting with an external magnetic field. To adjust the attitude of the spacecraft, the coil is electrically connected to a voltage ground, and a power bus controller through a plurality of coil switches for independently shunting current received from each solar cell string to the coil and thereby to the voltage ground for regulating the voltage on the power bus and for controlling the attitude of the spacecraft.

BRIEF DESCRIPTION OF THE DRAWINGS

These and other aspects of the invention will be more fully understood by referring to the following detailed description and the accompanying drawings, wherein.

DETAILED DESCRIPTION OF THE INVENTION

The present invention will be described in the context of a satellite in a conventional geosynchronous earth orbit. However, the invention may also be applied to satellites in other orbits, e.g. low earth orbit, satellites orbiting other bodies and to spacecraft traveling between celestial bodies but in the presence of a sufficiently strong magnetic field.

Figure 1:
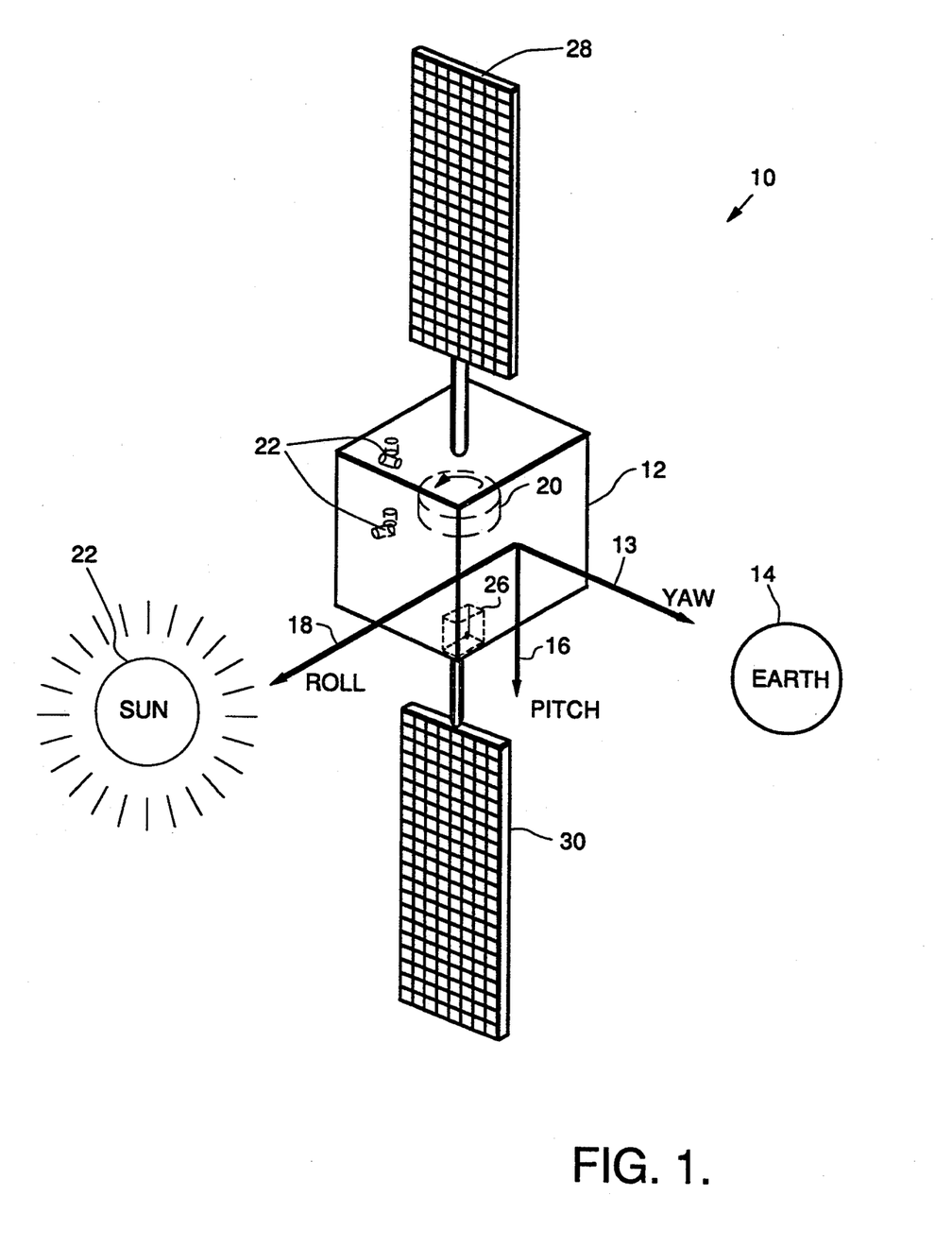
FIG. 1 is a diagram of a three axis body stabilized satellite having symmetric opposite north and south solar wings.

In FIG. 1, a satellite 10 includes a central or main body 12 depicted as a simple cube to render the axes easier to visualize. The yaw axis 13 is the axis in the orbital plane directed from the satellite main body to the center of the earth 14. The pitch axis 16 is directed normal to the orbital plane of the satellite and normal to the yaw axis. The roll axis 18 is perpendicular to the yaw and pitch axes and directed in the direction of travel of the satellite. The satellite also includes a momentum wheel 20 to stabilize the spacecraft's attitude. The momentum wheel is depicted as having a rotation parallel to the pitch axis; however, the particular orientation of the momentum wheel is not important to the present invention. In addition, the present invention can be applied to spacecraft without momentum wheels. The satellite may also have a variety of gyros 22 and sensors 26 to establish an inertial reference frame for properly orienting the satellite. The sensors and gyros develop information which is sent to a central processor (not shown) which operates the attitude control components or actuators of the satellite. Solar wings 28 and 30 project from the north and south ends of the main body respectively to generate power to drive the payload carried on the main body of the satellite. This payload may include a variety of communications devices or sensors depending upon the mission of the spacecraft. For simplicity, these communications and sensing payloads are not depicted in FIG. 1.

Figure 2:
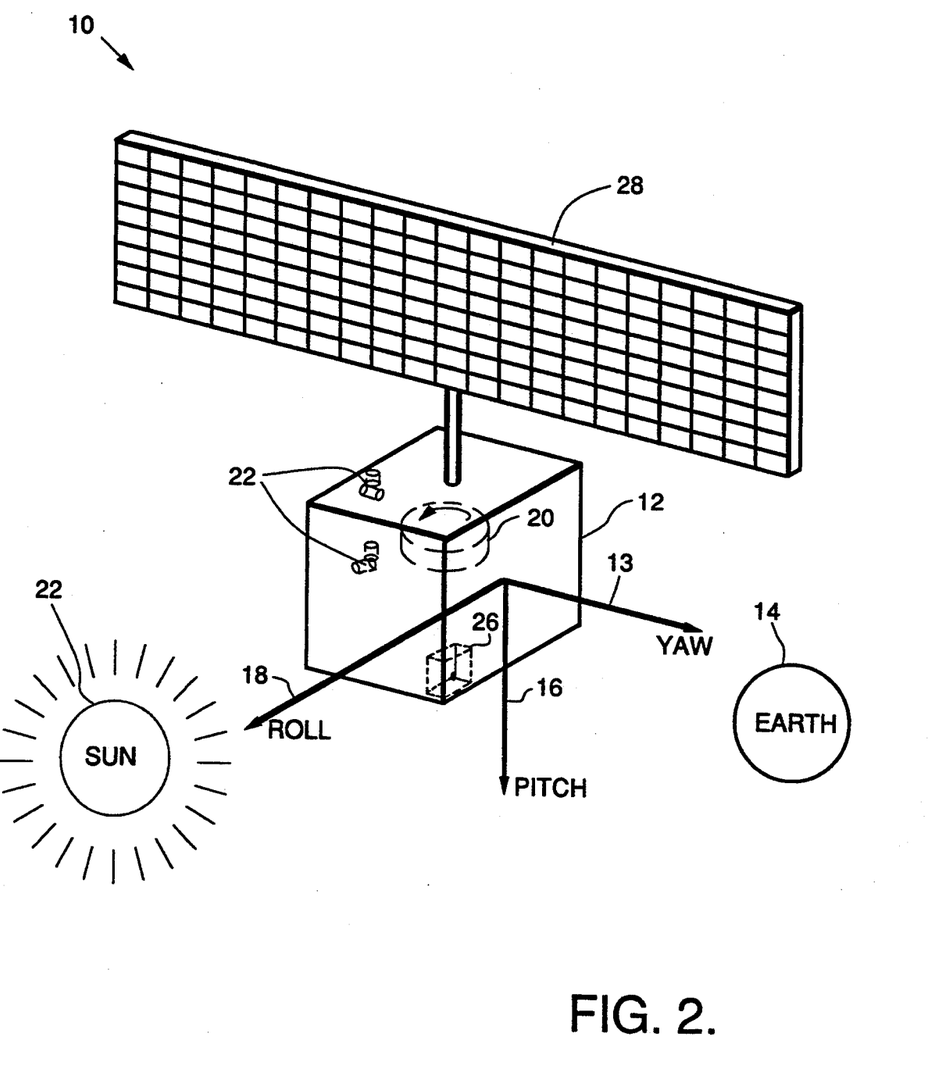
FIG. 2 is a diagram of a three axis body stabilized satellite having a single solar wing.

In some instances, it is preferred to use a single solar wing in a configuration similar to that shown, for example, in FIG. 2. In FIG. 2, a single solar wing 28 extends from one side of the spacecraft for generating power to drive the spacecraft main power bus. The spacecraft is otherwise the same as that shown in FIG. 1. The dual solar wing configuration of FIG. 1 is typically preferred because the solar pressures on the two solar wings are substantially balanced. For the satellite configuration shown in FIG. 1, the solar pressure on the north wing 28 induces a rotation about the yaw axis in a clockwise direction while the solar pressure on the south wing 30 induces a counterclockwise rotation about the yaw axis. These forces substantially balance each other reducing the demands on the attitude control system. In the spacecraft of FIG. 2, the solar pressure on the single solar wing 28 induces a similar rotation about the yaw axis; however, this force is not compensated by a symmetric counterforce. The spacecraft configuration of FIG. 2 however may be preferred for a variety of reasons, for example, a communications antenna or sensor may be mounted in a location which otherwise would be occupied by the south wing.

Figure 3:
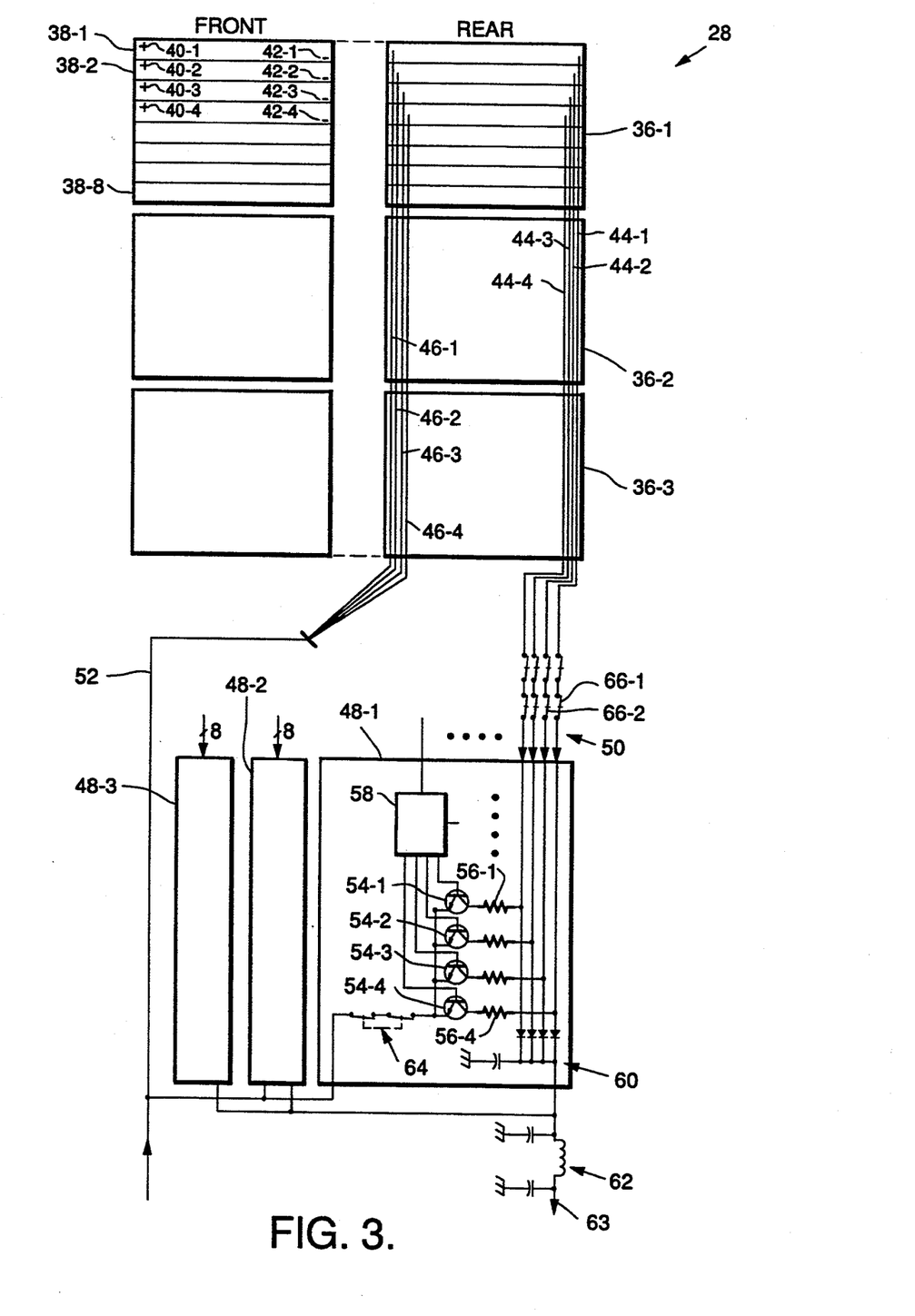
FIG. 3 is a diagram of a portion of a solar wing wiring scheme and a power bus controller for controlling the current provided by the solar wing, wherein the solar wing is designed to generate a magnetic field in one direction only.

FIG. 3 diagrams a preferred embodiment of the invention in which a typical solar wing 28 has three panels 36-1, 36-2, 36-3. The front face of each panel has eight individual strings 38-1 to 38-3 of solar cells (the wiring for only four strings is shown for simplicity). Each string has a positive terminal 40-1 to 40-4 and a negative terminal 42-1 to 42-4 which connect respectively to positive wires 44-1 to 44-4 and negative wires 46-1 to 46-4. The wires are routed along opposite outside edges of the rear face of each panel from the string to the spacecraft main body. The positive wires from each string are routed in close proximity to each other along the perimeters of the panels and as far away as possible from the negative wires on the opposite edge in order to maximize the magnetic moment due to the current flow closing an area between the two sets of wires. In a conventional solar array, unlike the present invention, the wires from the strings are also brought out on opposite edges of the rear face of the panel but the polarity of the strings alternate so that the current flow in each successive adjacent wire flows in the opposite direction. The wires are routed very close to each other in order to minimize the magnetic moment due to current in the wires.

The system of FIG. 3 also includes a set of voltage control modules 48-1, 48-2, 48-3, one module for each panel, 36-1, 36-2, 36-3. Each module has a current input terminal 50 to receive the eight wires coupled to the positive terminals of the eight strings of the corresponding panel. The modules share a common return bus 52 which is connected to the negative terminal of each string through the corresponding wires on each panel. The positive terminal connecting wires 44-1 to 44-4 couple into the solar array input 50 of the voltage control module and the wires coupled to the negative terminals of the solar cell strings connect into the solar array return line 52 of the voltage control modules. This generates a current loop along the two wires sets 44, 46 through the voltage controller and back through the solar cell strings. Since all solar cell strings are aligned in the same direction and the wires are placed at the extreme edges of the solar wings in order to maximize the area enclosed by the wires, an appreciable magnetic field is generated by the solar cell current through the wires to the voltage control modules. When this magnetic field interacts with the magnetic field of a celestial body, for example, that of the earth in an earth orbiting satellite, a torque is generated which affects the attitude of the spacecraft. This torque is generated using the wires which are otherwise necessary to convey electricity from the solar cell strings to the main spacecraft body power bus and, therefore, the magnetic torquing is achieved without adding any weight to the spacecraft.

A simple wiring arrangement such as that shown in FIG. 3 is preferred, for example, in the case of a single solar wing spacecraft such as that shown in FIG. 2. In that case, the direction of current flow can be arranged so that the generated magnetic field counteracts the unbalanced solar pressure on the single solar wing 28. In a satellite in an equatorial orbit, the magnetic torque generated by the solar wing automatically adjusts to changes in solar pressure caused by eclipses. When the satellite goes into an eclipse, solar pressure essentially stops; however, the solar cell strings also stop generating current so there is no counter force created by the magnetic torquing coils. The system also tends to compensate for significant changes in the radiation intensity of the sun because the solar wing tracks the sun. As the satellite orbits the earth, the magnetic torquing coil which is carried on the solar wing is always oriented in a direction to directly compensate for the solar pressure regardless of the orientation of the main body of the satellite.

The wiring arrangement of the wing can be designed so that the magnetic moment generated counterbalances the solar pressure as closely as possible. The wiring scheme of FIG. 3 can also be applied to a dual wing satellite such as that shown in FIG. 1. In such a case, it is preferred that the solar wings be wired so that each one produces an equal and opposite magnetic torque. These torques balance themselves minimizing any rotational effects on the spacecraft. However, the coils which are inherently a part of the solar panel wiring can be used to generate attitude correcting forces through the operation of the voltage control modules as will be described below.

Referring to FIG. 3, the current produced by the solar cell strings is routed into the voltage control modules 48. Preferably, a single voltage control module will be used for each solar cell panel so that each voltage control module has eight solar cell string inputs. However, in FIG. 3 only four inputs are shown for simplicity. The current from each solar array is routed to a shunting switch 54-1 to 54-4 through a load 56-1 to 56-4. The shunting switches are controlled by a control circuit 58 which is operated by the spacecraft's attitude control system or electrical power subsystem main processor (not shown) to regulate bus voltage. When the switches are open, the current flows through a series of filters 60, 62 through a power bus output terminal 63 into the main spacecraft power bus to current consuming devices on the spacecraft. When a switch is closed, current instead flows through a set of safety switches 64 to the return bus 52 and back to the opposite pole of the solar panel. The safety switches 64 are designed to open the shunting circuit back to the solar array return bus 52 in the event that a shunting switch 54 fails closed. The return line 52 also acts as the ground for the spacecraft chassis and is coupled to the ground terminal connections of the current consuming devices on the spacecraft.

The voltage control module is responsible for controlling the voltage supplied on the main power bus 63 to current consuming devices on the spacecraft. When the voltage on the power bus is too high, a shunting switch is closed, shunting the current from the selected solar cell string back to the return line to the solar array removing that current supply from the spacecraft power bus. When the spacecraft voltage is too low, one of the closed shunting switches is opened restoring additional power to the power bus. As the power requirements of the current consuming components vary, the supplied power varies as well. There is a difference of 5% or 6% between the current in the wiring loop for a solar cell string when the string is shunted and when the current is fed into the main power bus. In a satellite with both north and south solar wings, a magnetic torque can be generated in either direction by adjusting the total current flow in the wiring loop on the different solar panels. When a string is shunted, the current is increased by 5% or 6% increasing the magnetic moment of the corresponding panels. By shunting more solar array strings on one panel than another, a magnetic torque is generated proportional to the difference in total current flow in the areas enclosed by the total current loop.

Alternatively, the magnetic moment can be controlled using a current control switch 66-1, 66-2 (FIG. 3). Preferably, a current control switch is used for each solar cell string; however, only four are shown for simplicity. These switches open the wire loop coupling the solar cell strings to the voltage control module and are also controlled by the control circuit 58 of the corresponding voltage control module 48. When these switches are opened, there is no current flow through the affected string wiring creating a still further difference in magnetic moment produced by any particular string. By manipulation of the shunting switches 54 and the current switches 66 for each string in each of the panels of a satellite, a broad range of magnetic moments can be created while still supplying adequate power to the current consuming devices on the spacecraft.

Figure 4:
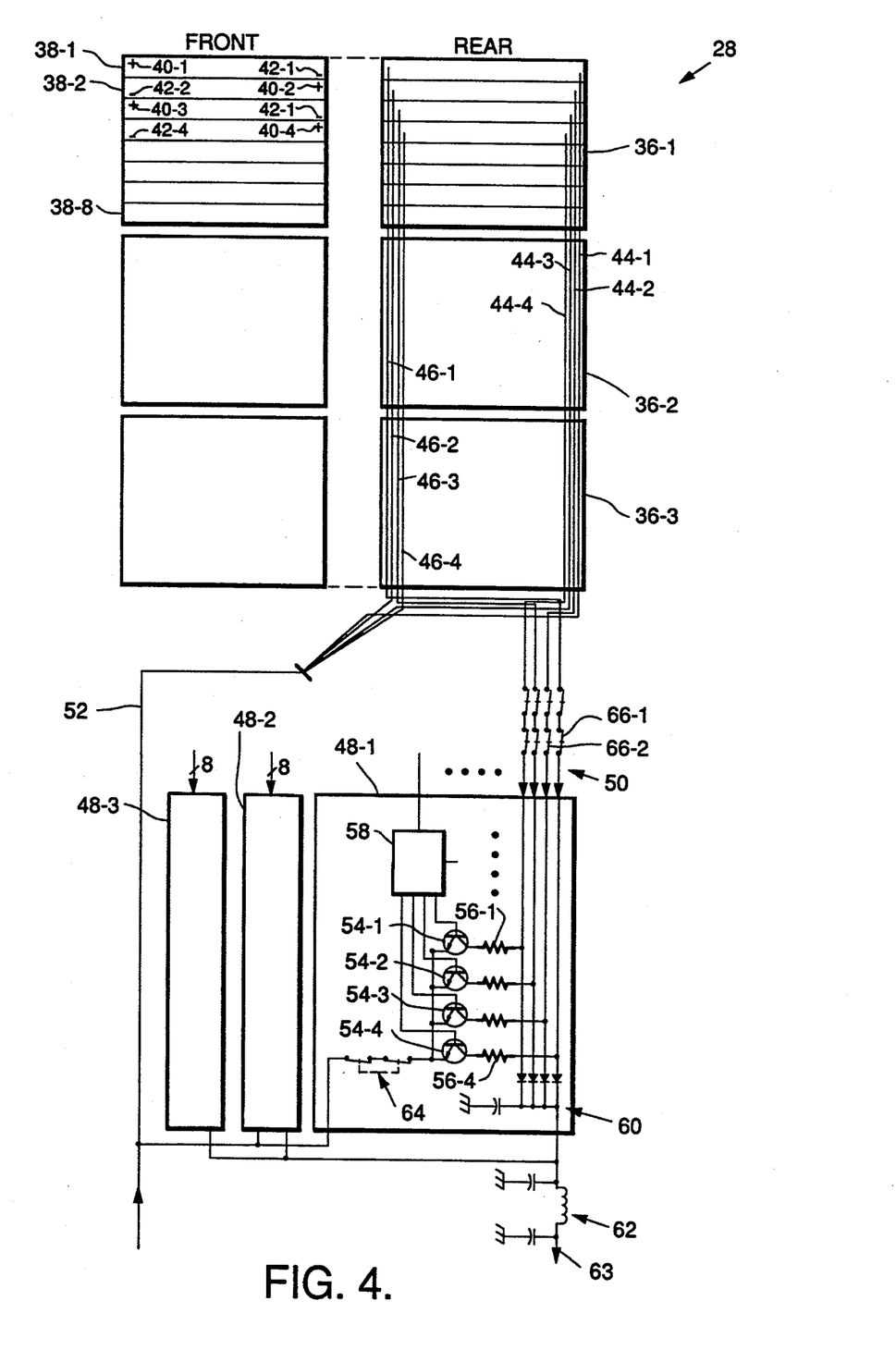
FIG. 4 is a diagram similar to that of FIG. 3 of a solar wing wired to generate magnetic torques in equal and opposite directions.

In the alternative, the solar cell strings may be arranged so that neighboring strings produce current in opposite directions as shown in FIG. 4. Current produced by the solar cell strings is routed along wires connected to the rear face of the solar panels in the same way as for FIG. 3 and the current flow is controlled using switches in the same manner as described above with respect to FIG. 3. However, since the current flow is in opposite directions for neighboring coils, the coils can be used to create a magnetic moment in either one of two opposite directions.

Figure 5:
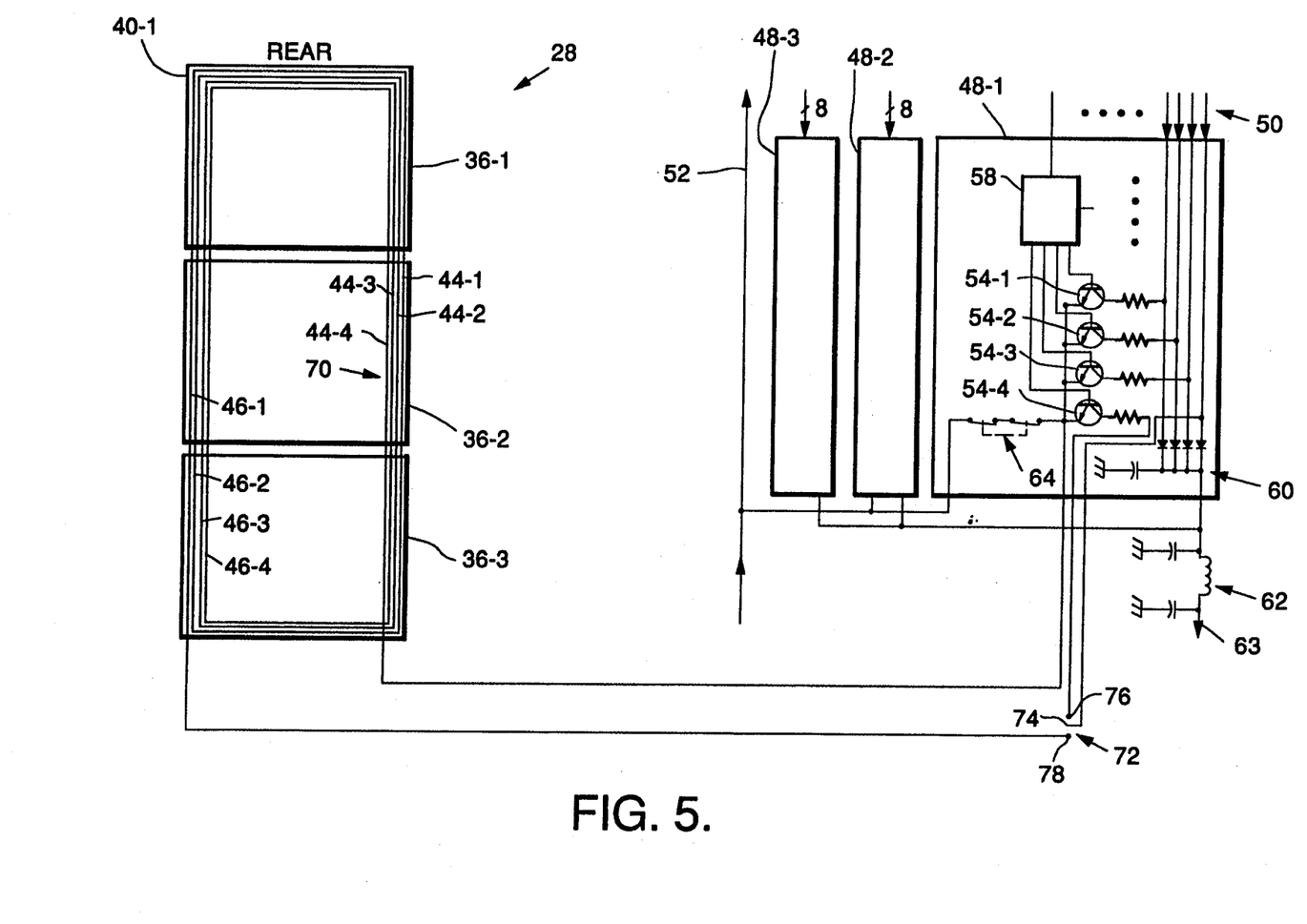
FIG. 5 is a diagram of a magnetic torquing coil applied to the back surface of a solar wing and a power control system for operating it.

FIG. 5 shows an alternative embodiment of the invention in which an air core torque coil 70 has been added to the rear face of a solar wing. The torque coil is wired independently of the solar cell strings (not shown). The solar cell strings may be wired in a conventional fashion to minimize the magnetic moment produced by the strings. The torque coil of FIG. 5 may also be combined with the solar cell string wiring arrangements shown in FIGS. 3 and 4, if desired, for still greater flexibility. The solar cell strings are coupled to the voltage control module input 50 and are routed as described above with respect to FIG. 3 within the voltage control module 48. However, in contrast to FIG. 3, a coil switch 72 and the air coil 70 are inserted between each solar array input and shunting switch 54-1 to 54-4. For simplicity, only one coil switch 72 coupled to only one shunting switch 54-4 is shown. However, the switching for the other eight inputs of each panel are arranged in a similar fashion each with its own coil switch. It is presently preferred that all of the strings on each panel be connected to a common bus to drive the same coil. However, more than one coil may be used.

The coil switch 72 is a three position switch. The first terminal 74 is coupled directly to the current supply from the corresponding solar cell string, in this case string 4. The second terminal 76 is coupled to the resistive load 56-4 which in turn is coupled to the shunting switch 54-4. Accordingly, when the first and second terminals are coupled together no current from the fourth string flows into the coil. Current flows instead directly to the shunting switch similar to the manner shown in FIG. 3. In this case, the voltage control module operates in the same way as described above with respect to FIG. 3. When the shunting switch is closed, the current from the solar string is shunted directly back to the grounded return line. When the switch is open, the current is routed into the current consuming devices on the spacecraft. The third terminal 78 is coupled to the additional coil 70 on the solar wing. When the first and third terminals are connected together, current flows from the solar cell string through the coil and is then shunted directly to the spacecraft ground and solar array return line bypassing the shunting switch 54-4. The coil switch 72 can also be left in an open position so that no current flows through the switch. In this case, both the shunting switch and the coil are bypassed and current from the solar cell string flows directly into the spacecraft power bus. The arrangement of FIG. 5 allows current which otherwise would be shunted to ground in order to regulate the voltage supply on the spacecraft power bus to be used for attitude control.

When the voltage on the spacecraft power bus is too high, for example, early in the mission before the solar cells have degraded, or late in the mission when some loads fail, a voltage module will be instructed to shunt current from one or more solar cell strings to ground. In a conventional solar wing and voltage control system this power is wasted. However, with the present invention, the excess power can instead be routed through the torquing coil and then to ground so that power which would otherwise be wasted is used to accomplish attitude control. A conventional attitude control computer or ground station modified for use with the present invention can be used to determine which solar cell string should be shunted to ground and which strings should be shunted to ground through the magnetic coil to achieve the desired attitude adjustment.

Figure 6:
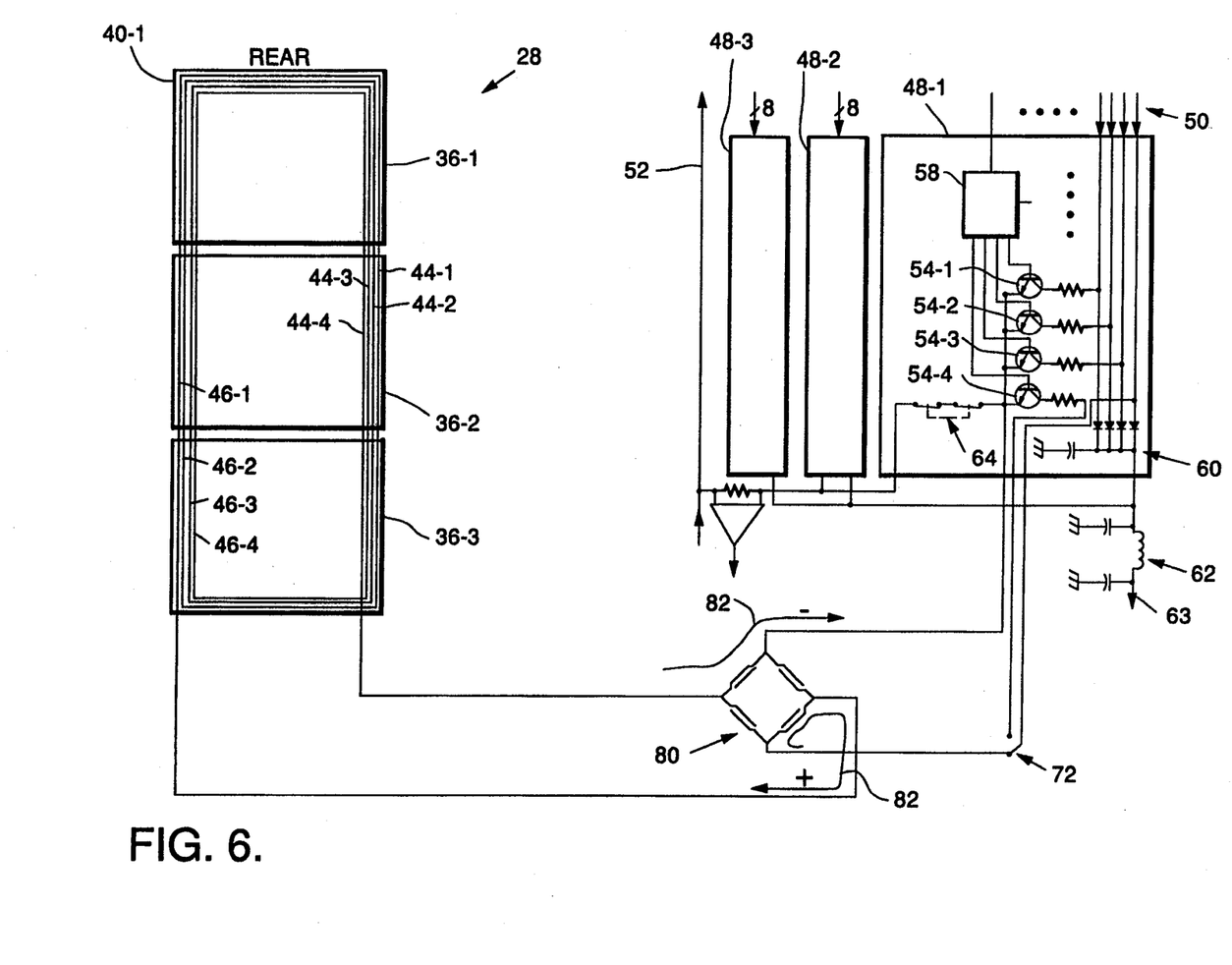
FIG. 6 is a diagram of the system of FIG. 5 including a relay set for controlling the direction of current through the magnetic coil on the solar wing showing current flow in a first direction.
Figure 7:
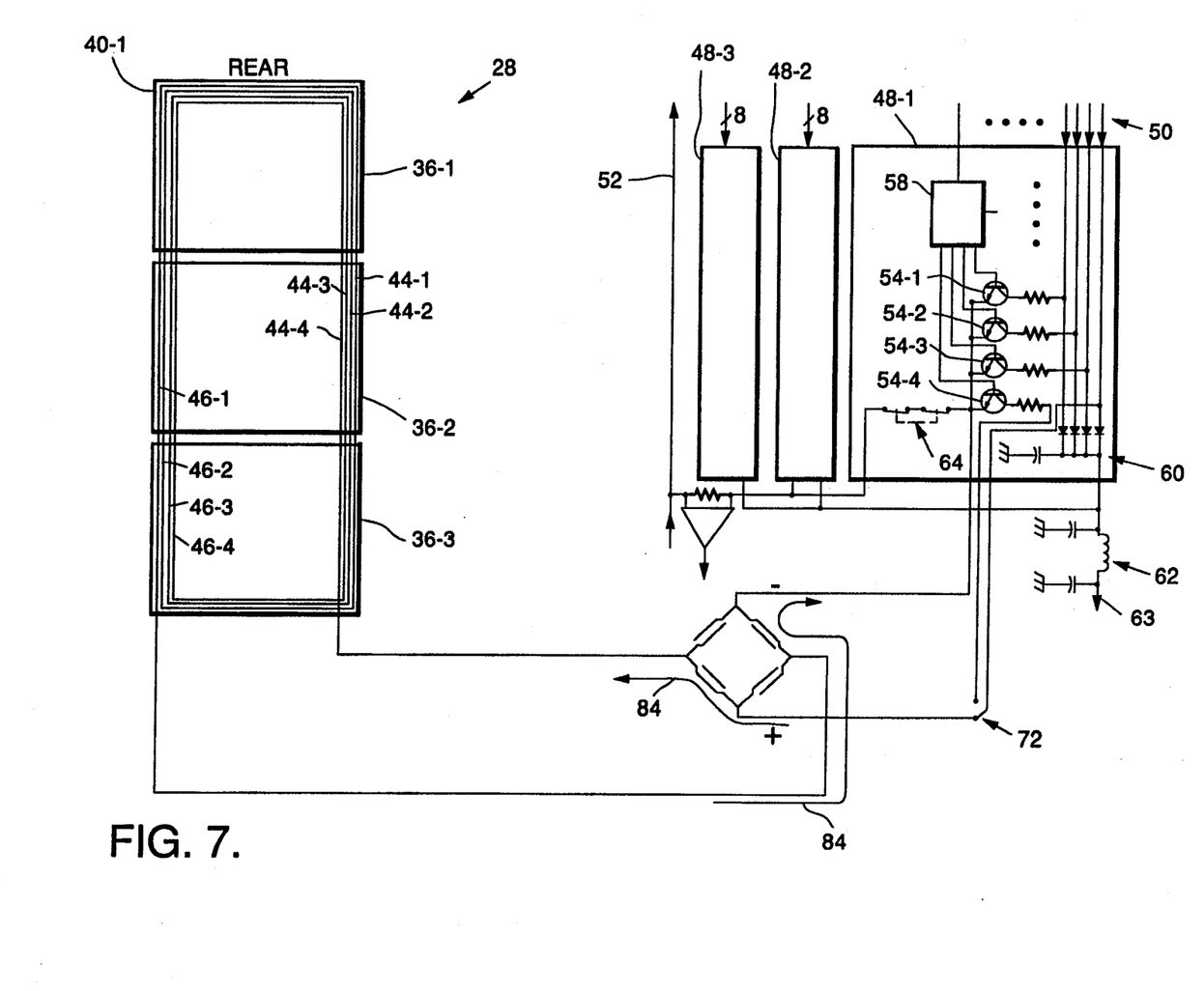
FIG. 7 is a block diagram similar to that of FIG. 6 showing current flow in a second opposite direction.

The flexibility of this system can be enhanced still further by adding a polarity switch 80. Such a switch is shown for example in FIG. 6 as a set of relays which route current in either one of two different directions. The direction of current flow is shown in FIG. 6 by arrows 82. In FIG. 7 the relays have been reversed so that current flows in the opposite direction as indicated by arrows 84. The polarity switch allows a magnetic moment in either one of two opposite directions to be generated by the coil on the solar panel. As with the other embodiments of the present invention, a coil similar to that shown in FIGS. 5, 6 and 7 may be incorporated on either one or both of the wings of a dual wing spacecraft allowing still greater flexibility in use of the coils. Alternatively using the polarity switch, a magnetic moment in either one of two opposite directions can be generated using a single coil so that a second coil on the second solar wing becomes redundant. Accordingly, the polarity switch allows a significant reduction in the weight of the spacecraft or an increase in its reliability. With a single wing spacecraft, either a polarity switch or two separate coils would be necessary if it were desired to produce a magnetic moment in both directions. As with the embodiments of FIGS. 3 and 4 it is preferred that the wiring be placed on the back side of the solar panel to maximize the amount of space available for solar cells on the front of the panel. It is further preferred that the wiring be affixed as close to the outer perimeter of the solar wings as possible in order to maximize the area enclosed by the coils and therefore the magnitude of the torque produced by the coils. While the solar wing mounting location is preferred, the coil of FIGS. 5, 6 and 7 may instead be mounted on the spacecraft main body.

The present invention provides an effective source of attitude control torque without using expendable and limited propulsion fuel. It also allows greater flexibility when a spacecraft nears the end of its operational life. If fuel is plentiful, thrusters can be used for attitude control so that the solar panels can be used to maximize the available current supply. If fuel is low, as is typically the case, the spacecraft's electric power consumption can be reduced to maximize life. Often, portions of the payload fail as the spacecraft nears the end of its operational life freeing reserve power for attitude control thereby saving fuel and extending the life of the spacecraft. The system can be controlled either on the spacecraft or from the ground. The control may be autonomous, either sensing perturbations and controlling the coils to correct or commanding a fixed sequence of preprogrammed corrections based on the known behavior of the spacecraft in its environment. Alternatively, the system can be used as a backup, providing additional or backup control only when needed.

It will be appreciated by one skilled in the art that a great variety of modifications and adaptations may be made to the disclosed embodiments without departing from the spirit and scope of the present invention. Any of the disclosed wiring configurations may be supplemented by a Vernier rod, an additional magnetic coil, thrusters or any other attitude control device for primary or supplemental control of the spacecraft's attitude. By describing only the embodiments above, it is not intended to limit the invention to the disclosed embodiments but only by the claims appended below.

What is claimed is:

1. An attitude control system for a spacecraft having a main body and a solar panel extending from the main body, the solar panel having a plurality of solar cells grouped into strings, each cell being electrically connected to the other cells in its respective string, for generating electric current for use by the spacecraft comprising:

an electrically conducting coil having a plurality of conductors coupled to the solar cells for conducting the current generated by the solar cell to the spacecraft main body for use by the spacecraft, each conductor being electrically connected to a different one of the strings, the coil being positioned so as to generate a magnetic field to interact with an external magnetic field for adjusting the attitude of the spacecraft.

2. The system of claim 1 further comprising a voltage controller for alternately coupling or decoupling current from the coil to current consuming portions of the spacecraft.

3. The system of claim 1 wherein the spacecraft center of solar pressure is displaced from the spacecraft center of mass and wherein the coil is adapted to at least partially compensate for attitude disturbances caused by solar pressure.

4. The system of claim 1 wherein each string has a positive end and a negative end, the conductors being connected across the positive and negative string ends.

5. The system of claim 4 wherein the conductors are connected and disposed so that at least some of the conductors generate a magnetic field substantially equal and opposite to others of the conductors.

6. The system of claim 1 further comprising a switch for alternately connecting the solar cell through the coil to a current consuming device on the spacecraft or to a voltage ground.

7. The system of claim 1 further comprising a switch for alternately breaking the flow of current through the coil.

8. A spacecraft comprising:
   a main body;
   a solar panel extending from the main body, the panel having a plurality of solar cells grouped into strings each cell being electrically connected to the other cells in its respective string for generating electric current
   an electrically conducting coil having a plurality of conductors coupled to the solar cells for conducting the current generated by the solar cells to the spacecraft main body for use by the spacecraft, each conductor being electrically connected to a different one of the strings, the coil being positioned so as to generate a magnetic field to interact with an external magnetic field for adjusting the attitude of the spacecraft.

9. The spacecraft of claim 8 wherein the conductors comprise a loop which extends substantially along the perimeter of the solar panel.

10. The spacecraft of claim 9 wherein the loop extends substantially along the entire solar panel perimeter.

11. The spacecraft of claim 9 wherein the solar panel is substantially in the shape of a flat, rectangular surface and wherein the loop is substantially rectangular and proximate the substantially rectangular edge of the panel.

12. The spacecraft of claim 8 wherein the conductors are connected and disposed so that at least some of the conductors generate a magnetic field substantially equal and opposite to others of the conductors.

13. The spacecraft of claim 8 further comprising a switch for alternately connecting a conductor to a current consuming device on the spacecraft or to a voltage ground.

14. The spacecraft of claim 8 further comprising a switch for alternately breaking the flow of current through a conductor.

15. The spacecraft of claim 8 wherein the spacecraft is adapted to orbit a celestial body and the external magnetic field comprises the magnetic field generated by the orbited celestial body.

16. The spacecraft of claim 15 wherein the celestial body comprises the earth.

17. The spacecraft of claim 8 further comprising a voltage controller for alternately coupling or decoupling current from the coil to current consuming portions of the spacecraft.

18. The spacecraft of claim 8 wherein the spacecraft center of solar pressure is displaced from the spacecraft center of mass and wherein the coil is adapted to at least partially compensate for attitude disturbances caused by solar pressure.

19. The spacecraft of claim 8 wherein each string has a positive end and a negative end, the conductors being connected across the positive and negative string ends.

20. The spacecraft of claim 8 wherein the payload comprises communications transponders.

21. An attitude control system for a spacecraft having a main body and a solar panel extending from the main body, the solar panel having a plurality of solar cell strings independently coupled to the spacecraft power bus for generating electric current for use by the spacecraft, the system comprising:

an electrically conducting coil on the solar panel adapted to carry current for generating a magnetic field for interacting with an external magnetic field to adjust the attitude of the spacecraft, the coil being electrically connected to a voltage ground;

a power bus controller having a plurality of coil switches for independently shunting current received from each solar cell string to the coil and thereby to the voltage ground for regulating the voltage on the power bus and for controlling the attitude of the spacecraft.

22. The system of claim 21 further comprising a polarity switch for controlling the direction of current flow through the coil and thereby controlling the orientation of the magnetic field generated by the coil.

23. The system of claim 21 wherein the power bus controller further comprises a plurality of shunting switches each shunting switch directly coupling a solar cell string to the voltage ground.

24. The system of claim 23 wherein the coil switches are electrically connected between the solar cell strings and the shunting switches and wherein the coil has a first end electrically connected to the coil switches and a second end electrically connected to the voltage ground.

* * * * *